(12) United States Patent
Boerer

(10) Patent No.: US 6,182,795 B1
(45) Date of Patent: Feb. 6, 2001

(54) METHOD FOR MOBILE SALES AND VEHICLES THEREFORE

(76) Inventor: Nyda Boerer, Suite 24E, 1530 Palisade Ave., Fort Lee, NJ (US) 07024

( * ) Notice: Under 35 U.S.C. 154(b), the term of this patent shall be extended for 0 days.

(21) Appl. No.: 09/183,965

(22) Filed: Nov. 2, 1998

(51) Int. Cl.$^7$ ........................................... B60P 3/025
(52) U.S. Cl. ............................. 186/52; 296/21; 296/24.1
(58) Field of Search ..................... 296/21, 24.1; 186/52

(56) References Cited

U.S. PATENT DOCUMENTS

| 1,372,854 | * | 3/1921 | Wieman | ............................. | 296/24.1 |
| 4,632,836 | * | 12/1986 | Abbott et al. | ....................... | 296/22 X |

FOREIGN PATENT DOCUMENTS

| 938123 | * | 9/1948 | (FR) | ....................................... | 296/21 |
| 906744 | * | 2/1982 | (SU) | .................................... | 296/24.1 |

\* cited by examiner

*Primary Examiner*—F. J. Bartuska
(74) *Attorney, Agent, or Firm*—Wolff & Samson

(57) ABSTRACT

The method and apparatus of the present invention relates to a method of selling merchandise, particularly clothing fashions and accessories, to customers at locations convenient to the customer. Initially, potential customers are identified and contacted by direct telemarketing. If a customer is interested in purchasing merchandise, an appointment is scheduled at a location convenient to the customer. At the appointed time, a mobile store vehicle is driven to the appointed location. A customer can enter the vehicle. The fashion coordinator can present a brief fashion show. The customer can browse through the inventory displayed within the vehicle. A salesperson can merchandise the inventory and provide fashion suggestions to the customer. The customer can try on the merchandise within the vehicle. The customer can purchase the fashions within the vehicle. The vehicle is equipped with racks for displaying merchandise, dressing room space to allow a customer to try on fashions, and a mirror to allow the customer to view themselves wearing the fashions. The customer can also purchase the fashions, as the vehicle is equipped with wireless means for interconnecting with a telecommunications network for verifying and accepting credit card charges. The vehicle is retrofitted to function as a mobile store with racks secured along the perimeter thereof to allow for clothing to be hung on hangers therefrom. Dressing room space is provided and a mirror can be attached in a desired location for allowing one to view themselves wearing the fashions.

14 Claims, 4 Drawing Sheets

METHOD FOR MOBILE SALES AND VEHICLES THEREFORE

BACKGROUND OF THE INVENTION

1. Field of the Invention

This invention generally relates to a method of selling merchandise to a customer at a location and time convenient to the customer. More specifically, the present invention relates to a method of selling clothing from a vehicle, which vehicle can be brought to a location convenient to the customer, wherein the customer boards the vehicle to enter a mobile store wherein the customer can stand up and walk through the vehicle and, wherein the customer is provided with sales help, dressing room space and the ability to purchase merchandise within the vehicle. Additionally, the present invention relates to a vehicle equipped for functioning as a mobile store. Essentially, the present invention relates to a fine fashion clothing store that drives directly to the customer's door.

2. Related Art

Conventionally, retail clothing stores have been located at fixed positions as a stand-alone store, or as part of a shopping center or mall or at some other location. As such, conventionally, customers travel to the stores to buy clothing. As such, a customer may browse through merchandise that is displayed and sales help may be provided for the customer. Further, customers can generally try on clothing in dressing rooms and then purchase the clothing at the store location. The customer is generally made aware of the location of the store through mass media advertising.

Other methods of retailing goods to customers are also known. For example, it is known to send catalogs to the houses of potential customers such that the potential customers can browse through the catalog, call up the store or the office from which the catalog was sent to place an order, and have the merchandise delivered via mail or another type of delivery service. However, this type of shopping experience has drawbacks, for example, the merchandising is not dynamic and not interactive, variations in body types are unaccounted for, the customer cannot try on the clothes prior to making a purchase, etc. Catalogs may also show designer fashions, and then substitute actual goods with affordable fabrics, which is why consumer may wonder why the picture and the actual item may not match.

A similar shopping experience can take place over the Internet wherein one uses an electronic catalog to browse through merchandise. However, as with traditional catalogs, there are limitations placed on transaction.

Another alternative merchandising method includes selling merchandise from a vehicle. An advantage of selling merchandise from a vehicle is that the vehicle is mobile and can move from place to place. However, most merchandise sold from vehicles, either at flea markets or other locations, allows the customer to view the merchandise housed within the vehicle from the exterior of the vehicle. Accordingly, one does not enter the vehicle to view the merchandise. One very important problem with this type of shopping scheme is that one often cannot try on the merchandise prior to purchasing same.

It is also known for people to bring fashions from a store location to one's home or office to allow one to browse merchandise and/or try on and purchase the merchandise in a convenient, comfortable location. However, one drawback with such a shopping method is that it is difficult to transport any real amount of inventory for one to review prior to making purchasing decisions.

Accordingly, what is needed, and has not heretofore been developed, is a flexible merchandising method wherein a targeted customer can be contacted directly by telephone to schedule an appointment at a location convenient to the customer, and a vehicle equipped as a mobile store can be brought to the customer's location, such that the customer can enter the vehicle, review the inventory on display therein, receive suggestions and/or tips from a salesperson therein, try on the merchandise, and purchase merchandise from within the vehicle.

None of the previous efforts in this area, taken either alone or in combination, teach or suggest all of the benefits and the utility of the present invention.

OBJECTS AND SUMMARY OF THE INVENTION

It is a primary object of the present invention to provide a method for selling merchandise to a customer at a location and time convenient to the customer.

It is another object of the present invention to provide a method of selling merchandise to a customer which is mobile but has all of the facilities one encounters at a fixed location store.

It is another object of the present invention which identifies target customers and then contacts such customers by direct telemarketing.

It is another object of the present invention to provide a method of selling merchandise to a customer which includes scheduling an appointment with a customer.

It is an additional object of the present invention to provide a method for selling merchandise to a customer at a location desired by the customer, wherein one drives a vehicle equipped as a mobile store to a location desired by a customer.

It is a further object of the present invention to provide a method of selling merchandise to a customer at remote locations which include merchandising fashions to customers, providing fashion tips to customers, allowing customers to try on fashions, allowing customers to browse through inventory, and allowing customers to purchase merchandise at the remote location.

It is an additional object of the present invention to provide a vehicle equipped as a mobile store.

It is an additional object of the present invention to provide a vehicle retrofitted to display merchandise.

It is even an additional object of the present invention to provide a vehicle wherein one can try on clothing.

It is even an additional object of the present invention to provide a vehicle wherein one can purchase clothing in any desired manner, i.e. with currency or with charge or credit cards.

The present invention achieves these objects with a method of selling merchandise, particularly clothing fashions and accessories, to customers at locations convenient to the customer. Initially, potential customers are identified and contacted by direct telemarketing. If a customer is interested in purchasing merchandise, an appointment is scheduled at a location convenient to the customer. At the appointed time, a mobile store vehicle is driven to the appointed location. A customer can enter the vehicle and browse through the inventory displayed within the vehicle. A salesperson can merchandise the inventory and provide fashion suggestions to the customer. The customer can try on the merchandise within the vehicle. The customer can purchase the fashions within the vehicle. The vehicle is equipped with racks for displaying merchandise, dressing room space to allow a customer to try on fashions, and a mirror to allow the customer to view themselves wearing the fashions. The customer can also purchase the fashions, as the vehicle is equipped with wireless means for interconnecting with a telecommunications network for verifying and accepting credit card charges. The vehicle is retrofitted to function as a mobile store with racks secured along the perimeter thereof to allow for clothing to be hung on hangers therefrom. Dressing room space is provided and a mirror can be attached in a desired location for allowing one to view themselves wearing the fashions.

BRIEF DESCRIPTION OF THE DRAWINGS

Other important objects and features of the invention will be apparent from the following Detailed Description of the Invention taken in connection with the accompanying drawings in which.

DETAILED DESCRIPTION OF THE INVENTION

The present invention relates to a method for selling merchandise, particularly clothing, to customers, such as women, that are for one reason or another are undesirous of attending stores at fixed locations and fixed hours. For example, career women have little time to travel to and from stores to shop. Accordingly, the present invention brings the store to the customer at a time desirable for the customer.

The method of selling merchandise to such women initially requires the identification of an appropriate customer. Typically, an appropriate customer is one with a busy life schedule such as a career person or a mother with children or one who has other obligations that take up a lot of time. Accordingly, convenience is highly desired by such customers. These customers, once identified, are best informed of the method through direct telemarketing, wherein the potential customer is called, the services provided are discussed, and hopefully, an appointment is made as to time and location wherein the mobile store of the present invention can be conveniently located for the customer to enter the mobile store and shop for merchandise.

Figure 1:
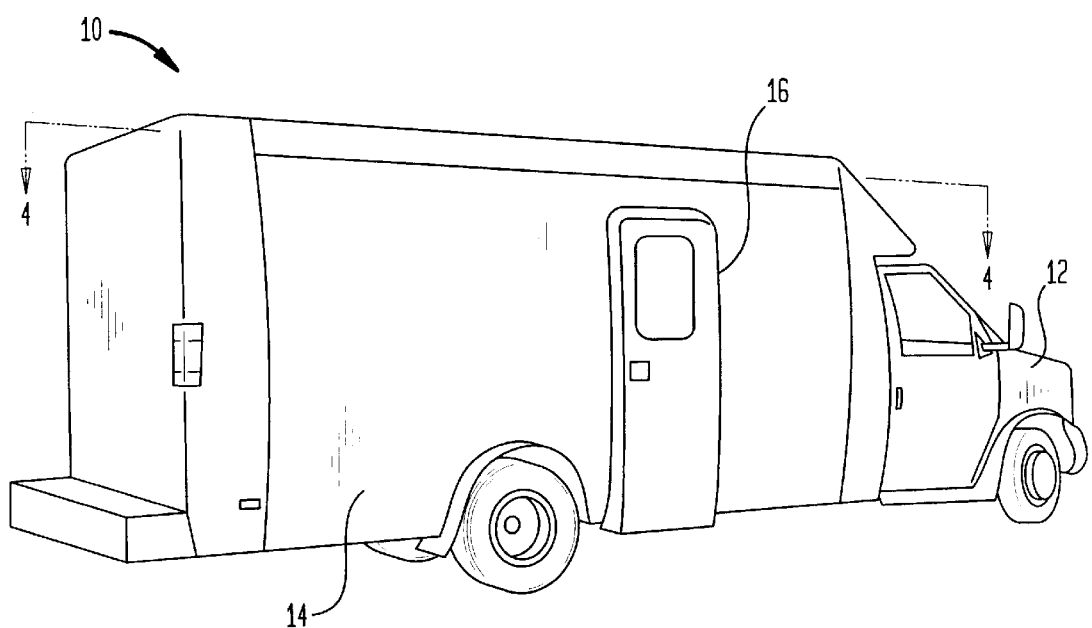
FIG. 1 shows a perspective view of the vehicle of the present invention.
Figure 2A:
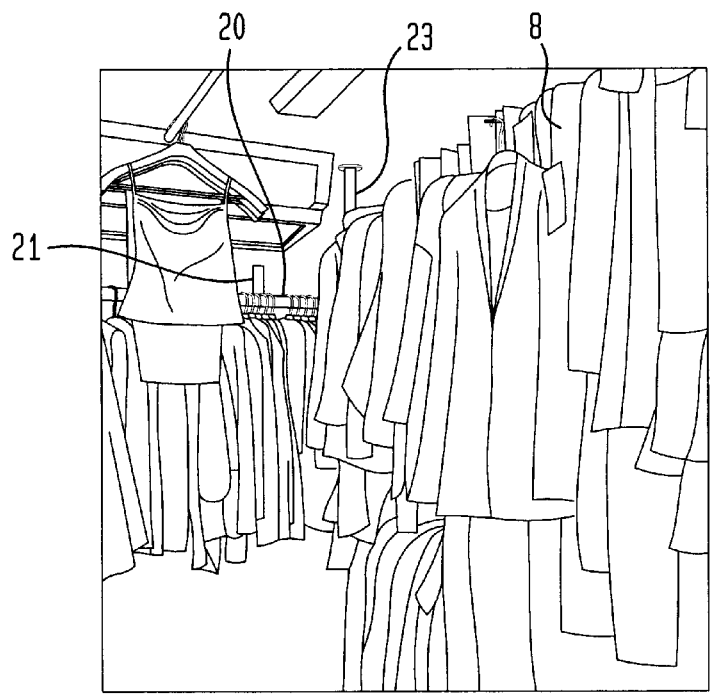
FIG. 2 is a cut away view of a portion of the interior of the vehicle shown in FIG. 1.
Figure 2B:
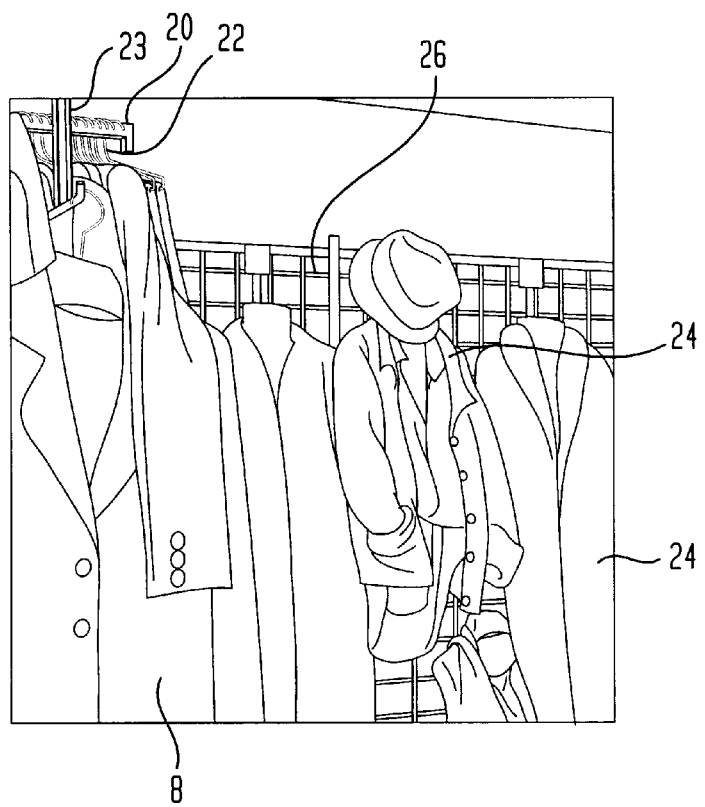
Figure 3A:
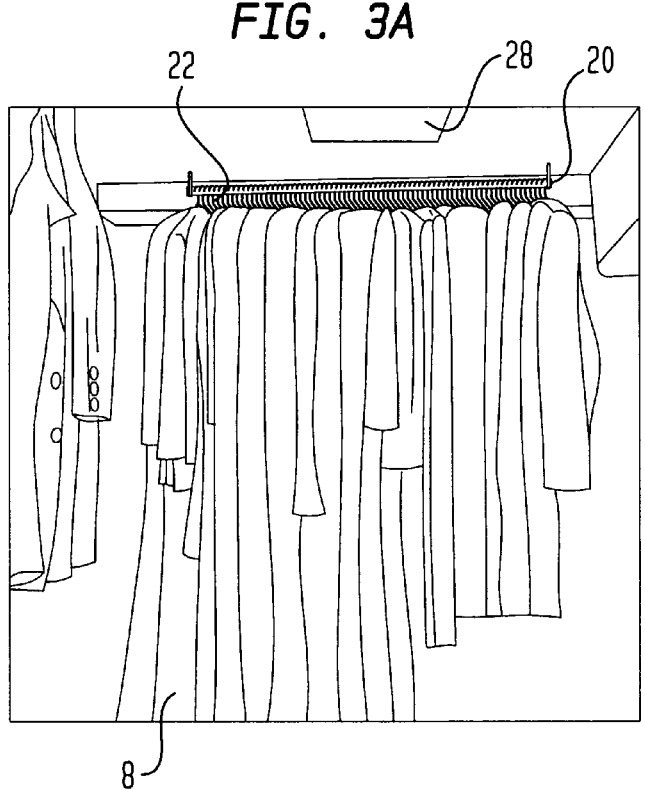
FIG. 3 is a cut away view of another portion of the interior of the vehicle shown in FIG. 1.
Figure 3B:
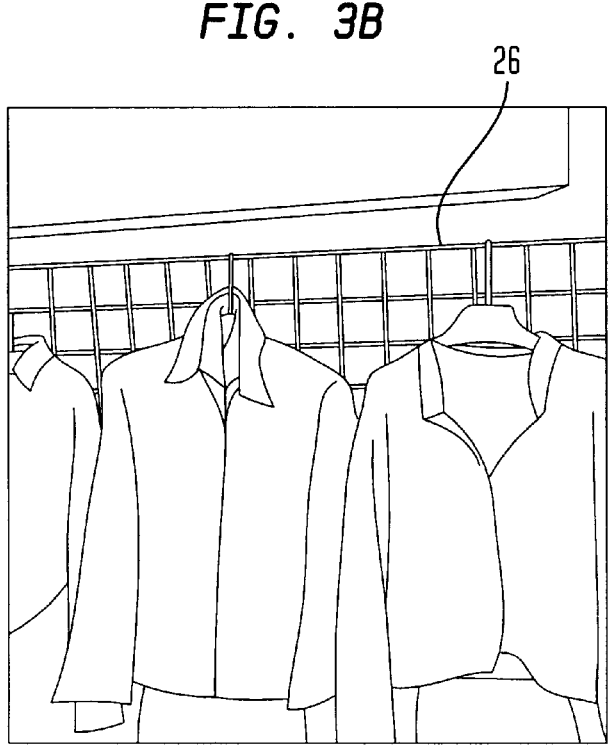

The mobile store comprises essentially a vehicle on wheels retrofitted to function as a store. FIG. 1 is a perspective view of the exterior of an embodiment of the mobile store of the present invention. The vehicle, generally indicated at 10, includes a forward driving cab portion 12 and a store portion 14 with access door 16. The interior of the vehicle is retrofitted to display merchandise as partially shown in FIGS. 2 and 3. As shown, pipe racks 20 are installed and attached to the perimeter of the vehicle to provide a fixed, sturdy support for merchandise 8 hung thereon by hangers 22 as is normally done in a conventional fixed location store. The pipe racks 20 can be attached to the interior of the vehicle by brackets 21, or they can be interconnected to the vehicle by floor to ceiling posts 23. Mannequins 24, grids 26, shelves, special hangers, layering hangers and displays are used to create lifestyle dressing.

A customer enters the mobile store through a door by ascending steps to within the vehicle. Standing within the vehicle, one can peruse the merchandise displayed on hangers hanging from the pipe racks about the perimeter of the vehicle. A space may be provided within the vehicle to allow the customer to try on clothes. A mirror 28 may be provided within the vehicle to allow the customer to view his or herself wearing the merchandise. The mirror may be suspended from the ceiling or otherwise pivotally attached to a location within the vehicle to allow the mirror to be utilized when desired, but to also allow it to be stored out of the way when not in use to maximize the space within the vehicle. A cash register means may be provided within the vehicle along with a credit accepting machine and modem interconnected with a cell phone to allow one to pay by credit card and to allow the seller to obtain credit card acceptance information prior to completing a credit card sale.

A highly desired location for an appointment may be at a customer's home, at a customer's office, at a nail salon, restaurant or at any location at which the customer spends time and can break away therefrom to shop at the mobile store, but which time would not be sufficiently great for the customer to travel to a fixed location store. There are no time constraints, a busy customer can shop at his or her own schedule at any desired location.

Figure 4:
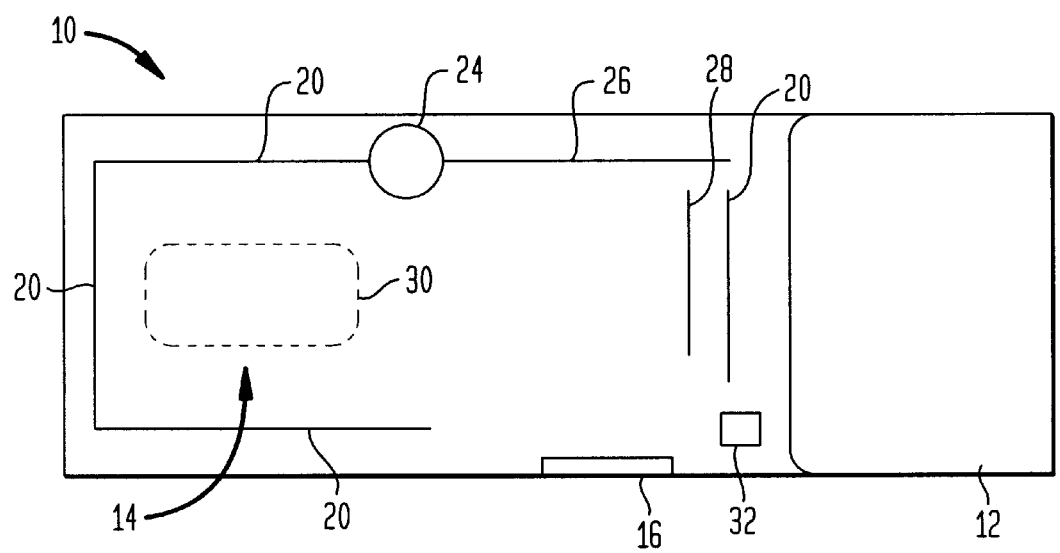
FIG. 4 is a sectional view of the vehicle shown in FIG. 1, taken along the line 4—4.

When a customer enters the vehicle, a body type analysis can be made and fashion suggestions can be made to the customer. Various merchandise can be combined to provide suggestions to the customer. The customer can browse the inventory about the interior of the vehicle. The customer can try on items in a dressing area and can view his or herself in a mirror wearing the clothing. The dressing room is shown in FIG. 4 as reference numeral 30, and a cash register is shown as reference numeral 32. Information can be provided to help the customer to compensate and/or accentuate the body style of the customer. Sales can be consummated in the same way as a fixed location store. Credit card authorization can be obtained through a modem interconnected with a cellular adapter to allow one to interconnect with a fixed network remotely.

After finishing with one customer, the vehicle can be driven to a subsequent appointment at a subsequent location with a subsequent customer to begin the sales process again. Importantly, the present invention provides a convenient way of shopping to customers, resembling a fixed location store, at any location convenient to the customer and at any time convenient to the customer as made by appointment with the mobile store vehicle.

Ultimately, there is a potential for the owner/operator/fashion coordinator to become a personal shopper for a customer to provide a tailored, buying service for the additional needs of each individual customer, i.e. the customer can be directly marketed to in the future based on the customer's fashion desires.

Having thus described the invention in detail, it is to be understood that the foregoing description is not intended to limit the spirit and scope thereof. What is desired to be protected by Letters Patent is set forth in the appended claims.

What is claimed is:

1. A method of selling merchandise to customers comprising:

scheduling an appointment with a customer;

driving a vehicle retrofitted as a retail store to a location requested by the customer;

bringing the customer into the vehicle;

displaying the inventory of merchandise within the vehicle for the customer to browse;

allowing the customer to try on merchandise within the vehicle;

pivoting a mirror down from the ceiling to allow a customer to view itself wearing the merchandise and pivoting the mirror up to take it out of the way when not in use; and allowing the customer to purchase merchandise.

2. The method of claim 1 further comprising the step of providing a fashion show for the customer.

3. The method of claim 2 further comprising the step of identifying potential customers and telephoning the potential customers to inform the potential customer of the service and to schedule an appointment.

4. The method of claim 3 further comprising the step of allowing a customer to view oneself wearing merchandise in a mirror after trying on same.

5. The method of claim 1 further comprising the step of allowing a customer to make purchases with a credit card.

6. The method of claim 5 further comprising the step of making suggestions to the customer about clothing appropriate for the customer.

7. The method of claim 6 further comprising the step of making suggestions to the customer concerning compensating or accentuating the customers body type.

8. A mobile retail clothing and accessory store comprising:

vehicle means for moving the mobile store to a desired location;

entry means for allowing a customer to enter the mobile store;

displaying means about the perimeter of the interior of the mobile store for displaying fashion merchandise;

dressing room means within the interior of the mobile store for allowing a customer to try on merchandise;

mirror means for allowing a customer to view itself wearing merchandise the mirror means being pivotally interconnected with the ceiling to be pivoted down for use and pivoted up to be retained out of the way when not in use; and cash register means for accepting payment for merchandise.

9. The apparatus of claim 8 wherein the display means comprises pipe racks mounted to the vehicle to allow clothes to be hung therefrom by clothes hangers.

10. The apparatus of claim 9 further comprising special display means.

11. The apparatus of claim 10 wherein the displays comprise mannequin forms.

12. The apparatus of claim 11 further including layering hangers.

13. The apparatus of claim 8 wherein the dress room means is formed by a fabric curtain.

14. The apparatus of claim 13 wherein the fabric curtain is hung from a rod positioned in a desired location within the mobile store.

* * * * *

UNITED STATES PATENT AND TRADEMARK OFFICE
CERTIFICATE OF CORRECTION

PATENT NO. : 6,182,795 B2 Page 1 of 1
APPLICATION NO. : 09/183965
DATED : February 27, 2007
INVENTOR(S) : Timothy J. Henly et al.

It is certified that error appears in the above-identified patent and that said Letters Patent is hereby corrected as shown below:

On the Title page, Assignee name is misspelled ("Atton"). The information for Assignee should read:

--(73) Assignee: Afton Chemical Intangibles LLC, Richmond, VA (US)--

Signed and Sealed this

Third Day of July, 2007

JON W. DUDAS
*Director of the United States Patent and Trademark Office*

UNITED STATES PATENT AND TRADEMARK OFFICE
CERTIFICATE OF CORRECTION

PATENT NO. : 6,182,795 B1  
APPLICATION NO. : 09/183965  
DATED : February 6, 2001  
INVENTOR(S) : Nyda Boerer It is certified that error appears in the above-identified patent and that said Letters Patent is hereby corrected as shown below:

This certificate supersedes Certificate of Correction issued July 3, 2007. The certificate should be vacated since no Certificate of Correction was granted for this patent number.

Signed and Sealed this

Seventh Day of August, 2007

JON W. DUDAS  
*Director of the United States Patent and Trademark Office*